US006795968B1

(12) United States Patent
Sobeski et al.

(10) Patent No.: US 6,795,968 B1
(45) Date of Patent: Sep. 21, 2004

(54) DYNAMIC OBJECT BEHAVIOR FOR OBJECT-ORIENTED-COMPUTING ENVIRONMENTS

(75) Inventors: David A. Sobeski, Redmond, WA (US); Felix G. T. J. Andrew, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/199,604

(22) Filed: Nov. 25, 1998

(51) Int. Cl.[7] .............................................. G06F 9/44
(52) U.S. Cl. ...................................... 719/316; 719/318
(58) Field of Search ............................... 719/310–320; 707/100–104.1; 709/310–330

(56) References Cited

U.S. PATENT DOCUMENTS

| 5,469,555 | A |   | 11/1995 | Ghosh et al. ............... 395/460 |
| 5,485,617 | A | * | 1/1996  | Stutz et al. ................. 709/315 |
| 5,524,234 | A |   | 6/1996  | Martinez, Jr. et al. ...... 395/468 |
| 5,594,886 | A |   | 1/1997  | Smith et al. ................ 395/463 |
| 5,608,909 | A |   | 3/1997  | Atkinson et al. ........... 395/703 |
| 5,625,794 | A |   | 4/1997  | Inoue et al. ................ 395/465 |
| 5,692,187 | A |   | 11/1997 | Goldman et al. .......... 395/619 |
| 5,740,455 | A |   | 4/1998  | Pavley et al. .............. 395/777 |
| 5,787,442 | A |   | 7/1998  | Hacherl et al. ............ 707/201 |
| 5,815,648 | A |   | 9/1998  | Giovannetti .......... 395/182.03 |

(List continued on next page.)

FOREIGN PATENT DOCUMENTS

| EP | 0660231   | 12/1994 | ............. G06F/9/44  |
| EP | 0817037 A | 6/1996  | ............. G06F/9/46  |
| EP | 0762273   | 9/1996  | ............. G06F/9/44  |
| EP | 0833259 A | 9/1996  | ............ G06F/17/30 |
| EP | 0757313   | 2/1997  | ............. G06F/9/44  |
| WO | 98/21651  | 11/1996 | ............. G06F/9/44  |

OTHER PUBLICATIONS

Corkill, Daniel D., "The Dynamics of Modeling Change", AI & Objects, Aug. 1996, pp. 42–46.*
International Search Report—PCT/US 99/ 24357, 4 pages, (Mar. 14, 2000).
International Search Report—PCT/US 99/ 24358, 4 pages, (Mar. 14, 2000).
International Search Report—PCT/US 99/ 24343, 4 pages, (Mar. 14, 2000).
Box, D., "Essential Com", 1997 (ISBN 0–201–63446–5), pp. 1–420, (1997).
IBM, "Heterogeneous object model–view relationships", IBM Technical Disclosure Bulletin, vol. 33, NO. 68, 242–243, (Nov. 1, 1990).
IBM, "Highly Flexible Property Abstraction Framework of Non–restricted System Object Model Objects", IBM Technical Disclosure Bulletin, vol. 37, No. 9, XP000473417, 287, (Sep. 1, 1994).
IBM, "Objects with Multi–Personality", IBM Technical Disclosure Bulletin, vol. 37, No. 9, 661, (Sep. 1, 1994).
Ishimaru, T., et al., "An Object–Oriented Data Model for Mulitple Representation of Object Semantics", Systems & Computers in Japan, Scripta Technica Journals, NY, vol. 27, No. 9, 23–32, (Aug. 1, 1996).
Jaaksi, A., "Implementing Interactive Applications in C++", Software Practice & Experience, GB, John Wiley &Sons Ltd. Chichester, vol. 25, No. 3, 271–289, (Mar. 1, 1995).

(List continued on next page.)

Primary Examiner—St. John Courtenay, III
(74) Attorney, Agent, or Firm—Christensen O'Connor Johnson Kindness PLLC

(57) ABSTRACT

Dynamic object behavior for object-oriented environments. In one embodiment, a system having an object, a data store, and application. The object has a plurality of dynamic behaviors. The data store data regarding the plurality of dynamic behaviors. The application instantiates the object from data stored in the data store regarding the plurality of dynamic behaviors.

28 Claims, 3 Drawing Sheets

U.S. PATENT DOCUMENTS

| | | | | |
|---|---|---|---|---|
| 5,892,949 | A | | 4/1999 | Noble ......................... 395/704 |
| 5,951,680 | A | | 9/1999 | Redlin et al. ................... 713/1 |
| 5,956,508 | A | | 9/1999 | Johnson et al. ............. 395/683 |
| 6,088,739 | A | * | 7/2000 | Pugh et al. ................. 709/315 |
| 6,101,500 | A | | 8/2000 | Lau ............................ 707/103 |
| 6,104,963 | A | | 8/2000 | Cebasek et al. .............. 700/86 |
| 6,226,692 | B1 | * | 5/2001 | Miloushev et al. ......... 709/316 |
| 6,473,768 | B1 | * | 10/2002 | Srivastava et al. .......... 707/101 |

OTHER PUBLICATIONS

Lin, L., et al., "Dynamic window configuration in an object oriented programming environment", *Proceedings of the Annual Int'l computer Software & Applications Conf., IEEE, Comp. Soc. Press, vol. Conf. 13*, 381–388, (1989).

Taylor, D.A., "Object Technology: A Manager's Guide", (*2d ed. 1997*) (*ISBN 0–201–30994–7*), pp. 1–198 (1997).

International Search Report—PCT/US 00/06727, 8 pages, (Aug. 9, 2000).

Hamilton, G., "JavaBeans 1.01 specification", *Sun Microsystems, XP002130316, Mountain View, CA*, 40–52 (Jul. 24, 1994).

IBM, "Linking the slot values of different objects", *IBM Technical Disclosure Bulletin, vol. 38, No. 7, XP000521684*, 261, (Jul. 24, 1994).

Rumbaugh, J., "Controlling propagation of operations using attributes on relations", *Proc. of the Object oriented programming systems languagues and applications conf., XP000299836*, 285–296, (Sep. 25, 1988).

Mekhiel, N.N., et al., "Performance analysis for a cache system with different DRAM designs", *Electrical and Computer Engineering*, 365–368 (1993).

* cited by examiner

DYNAMIC OBJECT BEHAVIOR FOR OBJECT-ORIENTED-COMPUTING ENVIRONMENTS

RELATED APPLICATIONS

This application is related to the following applications, which are hereby incorporated by reference: "Object Model for Object-Oriented Computing Environments," U.S. application Ser. No. 09/200,489 and "Dynamic Data Cache for Object-Oriented Computing Environments," U.S. Pat. No. 6,304,879.

FIELD OF THE INVENTION

This invention relates generally to object-oriented computing environments, and more particularly to dynamic object behavior for such environments.

BACKGROUND OF THE INVENTION

Object-oriented programming environments are currently the standard environment in which computer programs are developed. For example, within the Microsoft Windows operating system, programs may be developed using the Component Object Model (COM) architecture. Object-oriented programming environments provide a modular manner by which developers can develop complex and sophisticated computer programs.

Generally, an object may include data and methods by which that data is accessed and changed. Thus, new methods may be added to the object for accessing and changing the data in other ways not previously possible, without affecting existing methods, and the external objects that rely on these existing methods. Upon receiving a message, or in response to an event, an object typically executes a particular method, resulting in the data within that object being retrieved or changed.

SUMMARY OF THE INVENTION

The invention provides for dynamic object behavior for object-oriented environments. In one embodiment, a system includes an object, a data store, and an application. The object has a plurality of dynamic behaviors. The data store stores data regarding the plurality of dynamic behaviors. The application instantiates the object from data stored in the data store regarding the plurality of dynamic behaviors. In addition, of the behaviors available to the object, the object is able to instantiate only a sub-set of all the behaviors, at run-time, depending on, for example, the current environment in which the object is instantiated.

The dynamic object behavior of the invention provides for advantages not found in the prior art. For example, typically within the prior art, an object's behavior is permanently defined, making it difficult to change that object's behavior. However, in embodiments of the invention, the object's behavior may be changed, by changing the data regarding the plurality of behaviors in the data store (such as, adding a behavior or removing a behavior), or by having the object instantiate different of all of the possible behaviors at run-time, as a result of a dynamic determination made at run-time by the object. The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fourth section, a conclusion of the detailed description is provided.

Hardware and Operating Environment

Figure 1:
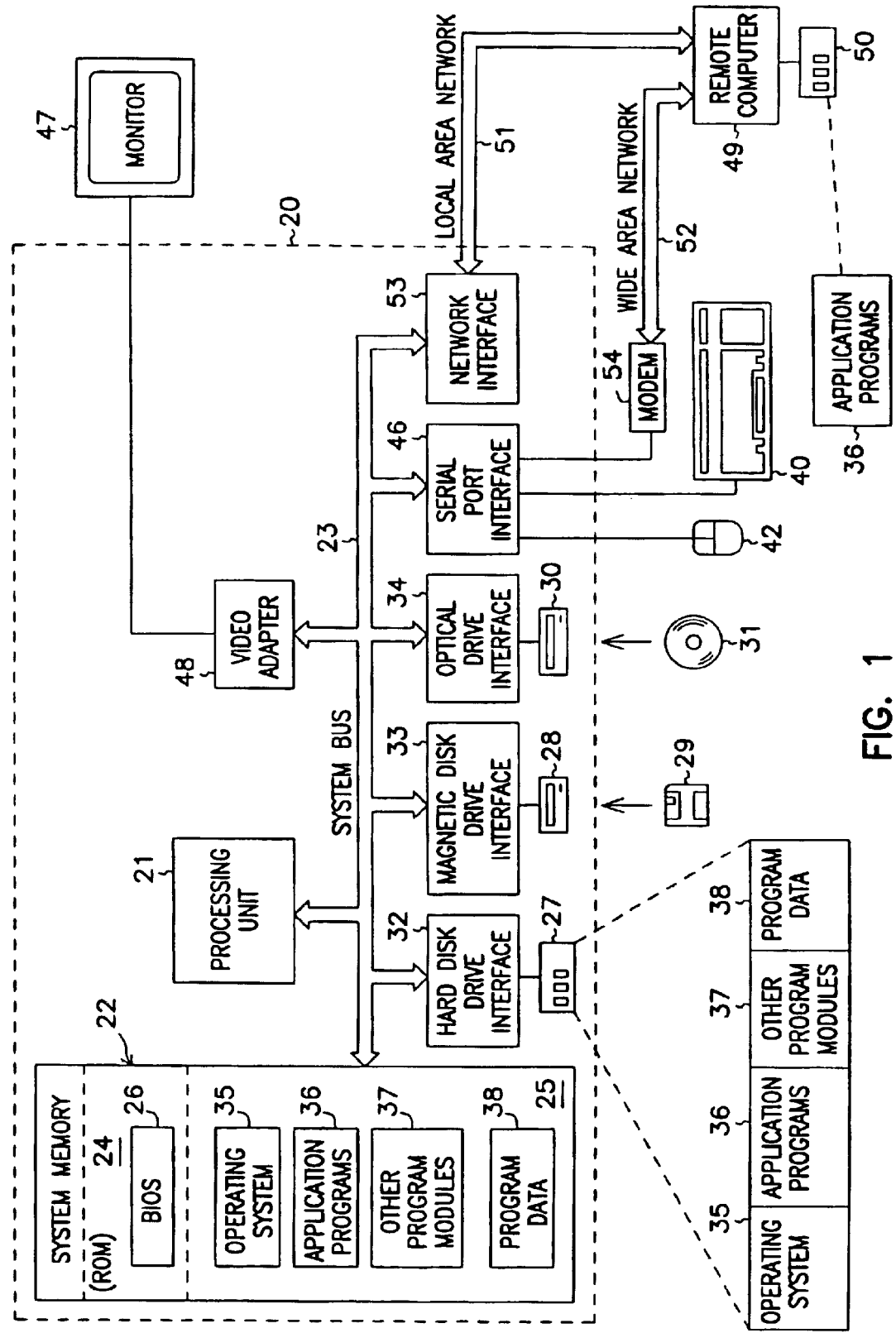
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internal. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
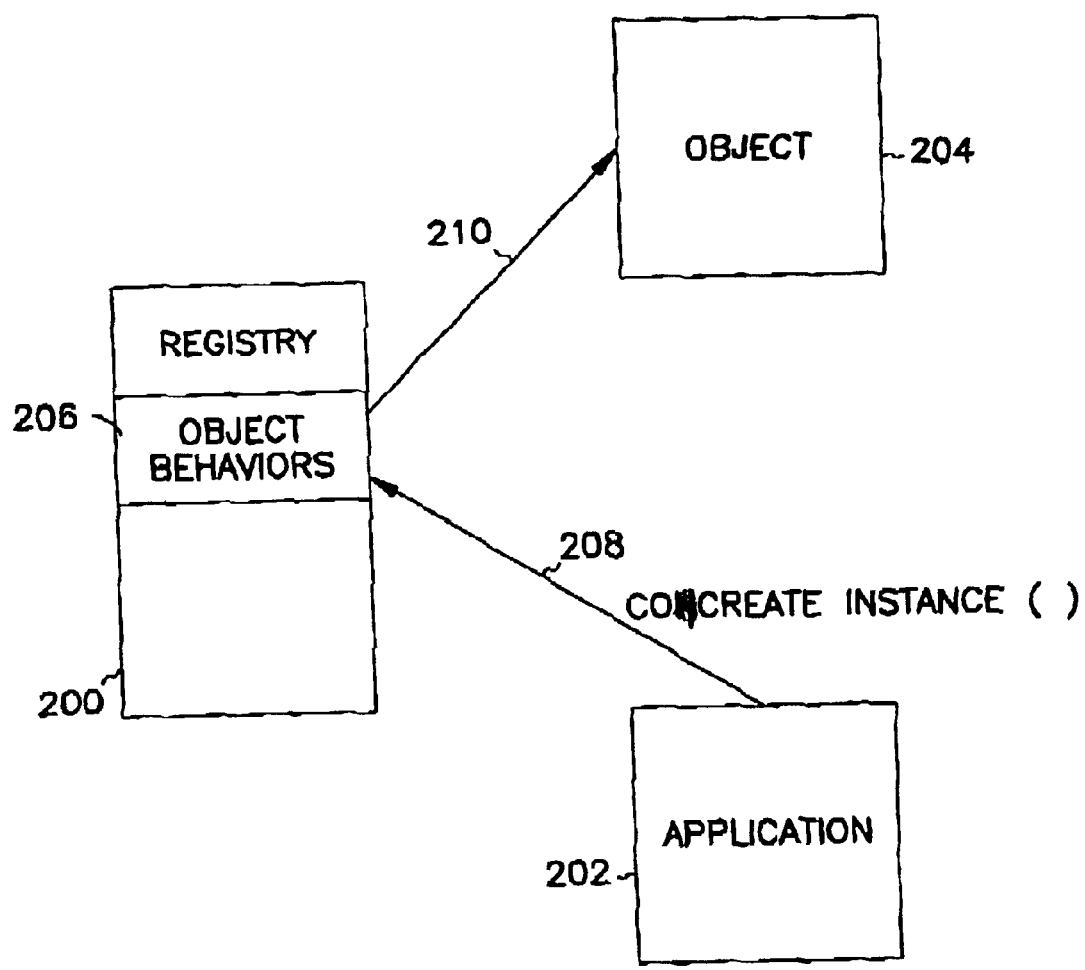
FIG. 2 shows a block diagram of a system according to one embodiment of the invention; and, FIG. 3 shows a flowchart illustrating a method according to one embodiment of the invention.

In this section of the detailed description, a description of a computerized system according to an embodiment of the invention is provided. The description is provided by reference to FIG. 2. Referring now to FIG. 2, a system according to an embodiment of the invention is shown. The system includes a Registry 200, an application 202, and an object 204. The Registry 200 is one type of data store; the invention is not so particularly limited. The Registry 200 is the data store used in conjunction with versions of the Microsoft Windows operating system.

In another embodiment of the invention, at run-time, the object itself determines what behaviors it believes it needs for a given situation, and only instantiates those behaviors for itself. Thus, dynamism in the object behaviors is achieved in two manners: first, the behaviors stored in the object's definition in the data store can be added or removed (viz., changed), and, second, the object is able to determine which behaviors to actually instantiate at run-time.

That is, behaviors may be instantiated as follows: with respect to the definition of the object stored in the Registry, behaviors can be added and subtracted a priori—before the object is ever instantiated. As a result of these newly instantiated objects, they may themselves instantiate additional behaviors—during the object instantiation (although they themselves do not necessarily have to be behaviors). When the object is instantiated, it can determine itself that not all the behaviors need to be included, such that it instantiates only those behaviors for itself that are necessary for a given situation, environment,etc.

This is accomplished in one embodiment as follows:
1) an object name is retrieved from the registry;
2) the object is instantiated;
3) if it has a behavior interface, then such an interface is added directly to the object;

4) if it has an add-more-behaviors interface, it calls the method associated with this interface, passing to the method the object itself;

5) the preceding step/act is repeated until there are no more entries; and 6) the object is now capable of adding behaviors.

The Registry 206 stores data 206 regarding a plurality of object behaviors for the object 204. These object behaviors are associated with the particular object 204. They may include: other objects, methods, events, properties, etc.; the invention is not so limited. In one embodiment, the object 204 is an object in accordance with the Component Object Model (COM), known within the art, such that the object behaviors are also in accordance with COM. The object behaviors may be system-defined or application-defined. They are dynamic in that behaviors regarding an object, as the data 206 thereregarding is stored in the Registry 200, may be added or removed.

The application 202 is, in one embodiment, an application program, such as a word processing program, a web browser program, etc. The application 202 as shown in FIG. 2 is instantiating the object 204 by issuing a CoCreateInstance() command, represented by arrow 208 and as known within the art. The results in the instantiation of the object 204, using the object behaviors as the data 206 thereregarding is stored in the registry 200, as represented by arrow 210.

Thus, the invention provides for dynamic object behavior. The object behaviors of the object 204, for example, may be initially system-defined—i.e., a default set of object behaviors. The application 202, however, may determine prior to instantiating the object 204 that it requires the object 204 to have behaviors that the object does not currently have. Therefore, it may add object behaviors to the data 206 stored in the Registry 200, prior to instantiating the object. This compares with the prior art, which provides for statically defined object behaviors of objects. Furthermore, the invention provides for dynamic object behavior in that the object may itself determine which of the object behaviors to instantiate based on the situation at hand.

It is noted that as to the embodiments of the invention described in conjunction with FIG. 2, the object, the data store, and the application can in one embodiment be stored on a computer-readable storage medium, such as a floppy disk or a compact-disc read only-memory (CD-ROM). In another embodiment, the objects are such that data representing them resides in a memory of a computer, executed by the processor thereof. The invention is not particularly limited, however.

Methods

In this section of the detailed description, methods according to an embodiment of the invention is presented. This description is provided in reference to FIG. 3. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer. Thus, in one example, an application program is executed by a processor of a computer from a memory thereof to instantiate an object from data stored in a data store of the memory, the data regarding the plurality of dynamic behaviors.

Figure 3:
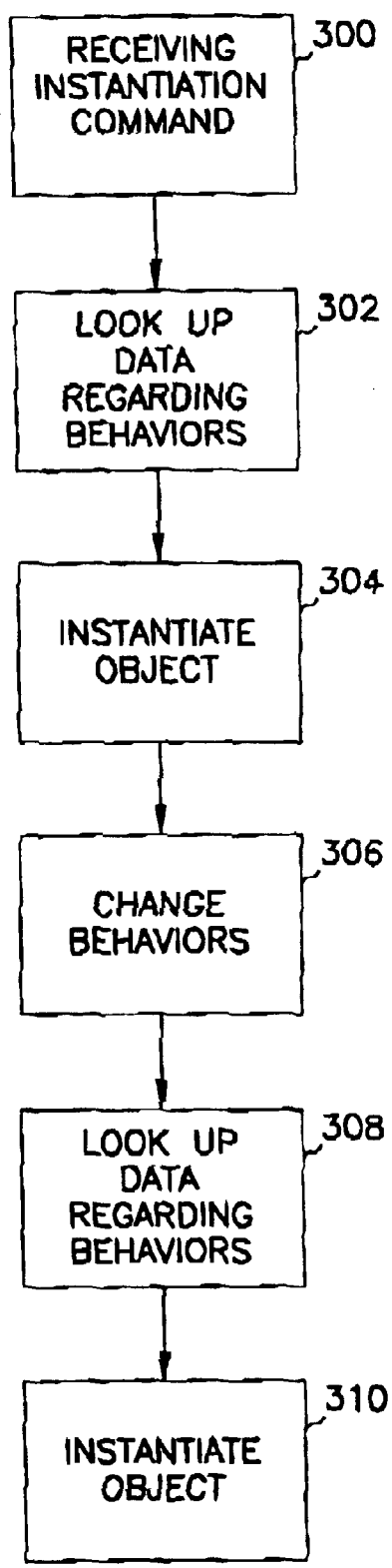

Referring now to FIG. 3, a flowchart of a method according to one embodiment of the invention is shown. In 300, a command to instantiate an object having a plurality of dynamic behaviors is received. This command may be, for example, a CoCreateInstance( ) command, as known within the art. In 302, data regarding the plurality of dynamic behaviors is looked up in a data store. In one embodiment, the data store may be the Registry, as is used in versions of the Microsoft Windows operating system and known within the art. The behaviors are dynamic in that they may be changed, as will be described. Thus, in 304, the object is instantiated, from the data regarding the plurality of dynamic behaviors of the object stored in the data store.

In 306, the dynamic behaviors of the object are changed. In one embodiment, this includes deleting one of the dynamic behaviors of the object. In another embodiment, this includes adding a new dynamic behavior to the dynamic behaviors of the object. Changing the dynamic behaviors of the object can also mean that the data stored in the data store regarding the plurality of dynamic behaviors is itself changed.

When the object is again instantiated, the object has different behaviors as when previously instantiated in 304. Thus, in 308, data regarding the plurality of dynamic behaviors is looked up in the data store, as those dynamic behaviors have changed. In 310, the object is instantiated, again from the data regarding the plurality of dynamic behaviors stored in the data store, but as has been changed. This means that the object instantiated in 310 has different dynamic object behaviors as compared to the object as instantiated in 304.

It is noted that the invention is not limited to the method of FIG. 3. For example, in the embodiment where the dynamic behaviors are stored in a dynamic store integral to the object itself, there may be many dynamic behaviors that can be instantiated by the object. However, because the object is able to determine which behaviors to actually instantiate—based on the current environment, etc.—dynamic behaviors are provided for in a manner different than that of FIG. 3. In such an embodiment, rather than looking up the data regarding the behaviors in 308, a (second) object is instantiated whose purpose is to provide data regarding the plurality of dynamic behaviors. The object desired is then instantiated.

Conclusion

Dynamic object behavior has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

We claim:

1. A system comprising:

a single object having a plurality of dynamic behaviors, wherein the plurality of dynamic behaviors are defined behaviors of the object;

a data store to store data regarding the plurality of dynamic behaviors; and, an application to instantiate the object from the data stored in the data store regarding the plurality of dynamic behaviors, wherein the object instantiates at least one of the plurality of dynamic behaviors.

2. The system of claim 1, wherein the data store is within the object.

3. The system of claim 2, wherein less than all of the plurality of dynamic behaviors of the object are instantiated.

4. The system of claim 2, wherein the object determines at run-time which of the plurality of dynamic behaviors to instantiate.

5. The system of claim 1, wherein the object comprises a Component Object Model (COM) object.

6. The system of claim 1, wherein the plurality of dynamic behaviors comprises at least one selected from the group essentially consisting of a plurality of methods, and a plurality of events.

7. The system of claim 1, wherein the data store comprises the Registry.

8. The system of claim 1, wherein the plurality of dynamic behaviors comprises a plurality of system-defined behaviors and a plurality of application-defined behaviors.

9. The system of claim 1, wherein the object instantiates at least one of the plurality of dynamic behaviors during instantiation of the object.

10. A method comprising:
receiving a command to instantiate a first instance of a single object having a plurality of dynamic behaviors, wherein the plurality of dynamic behaviors are defined behaviors of the object;
looking up data regarding the plurality of dynamic behaviors in a data store; and,
instantiating the first instance of the object from the data regarding the plurality of dynamic behaviors in the data store.

11. The method of claim 10, further comprising changing the plurality of dynamic behaviors.

12. The method of claim 11, wherein changing the plurality of dynamic behaviors comprises deleting one of the plurality of dynamic behaviors.

13. The method of claim 11, wherein changing the plurality of dynamic behaviors comprises adding a new dynamic behavior to the plurality of dynamic behaviors.

14. The method of claim 11, wherein changing the plurality of dynamic behaviors comprises changing the data stored in the data store regarding the plurality of dynamic behaviors.

15. The method of claim 11, further comprising:
looking up data regarding the plurality of dynamic behaviors in the data store as have been changed; and,
instantiating a second instance of the object from the data regarding the plurality of dynamic behaviors as have been stored in the data store, wherein the first and second instances of the object exhibit different dynamic behaviors.

16. The method of claim 15, further comprising:
instantiating a data providing object to provide data regarding the plurality of dynamic behaviors; and,
instantiating at least one instance of the object from the data regarding the plurality of dynamic behaviors.

17. The computer of claim 15, wherein the object comprises a Component Object Model (COM) object, and the data store comprises the Registry.

18. A computer-readable medium having data stored thereon representing:
a single object having a plurality of dynamic behaviors, wherein the plurality of dynamic behaviors are defined behaviors of the object;
a data store to store data regarding the plurality of dynamic behaviors; and,
an application to instantiate the object from the data stored in the data store regarding the plurality of dynamic behaviors.

19. A computer-readable medium having a computer program stored thereon for execution on a computer, the program performing the method comprising:
receiving a command to instantiate a first instance of the single object having a plurality of dynamic behaviors, wherein the plurality of dynamic behaviors are defined behaviors of the object;
looking up data regarding the plurality of dynamic behaviors in a data store;
instantiating the first instance of the object from the data regarding the plurality of dynamic behaviors in the data store;
changing the plurality of dynamic behaviors;
looking up data regarding the plurality of dynamic behaviors in the data store as having been changed; and,
instantiating a second instance of the object form the data regarding the plurality of dynamic behaviors as have been changed stored in the data store, wherein the first and second instances of the object do not exhibit the same dynamic behaviors.

20. A computer comprising:
a memory;
a processor
a data store of the memory to store data regarding a plurality of dynamic behaviors for a single object; and,
an application executed by the processor from the memory to instantiate the object from the data stored in the data store regarding the plurality of dynamic behaviors.

21. A system comprising:
a single object having an interface and also having a plurality of dynamic behaviors, wherein the interface and the plurality of dynamic behaviors are defined for the object;
a data store to store data regarding the plurality of dynamic behaviors; and,
an application to instantiate the object from the data stored in the data store regarding the plurality of dynamic behaviors, and
wherein the object instantiates at least one of the plurality of dynamic behaviors.

22. The system of claim 21, wherein the data store is within the object.

23. The system of claim 22, wherein less than all of the plurality of dynamic behaviors of the object are instantiated.

24. The system of claim 22, wherein the object determines at run-time which of the plurality of dynamic behaviors to instantiate.

25. The system of claim 21, wherein the object comprises a Component Object Model (COM) object.

26. The system of claim 21, wherein the plurality of dynamic behaviors comprises at least one selected from the group essentially consisting of a plurality of methods, and a plurality of events.

27. The system of claim 21, wherein the data store comprises the Registry.

28. The system of claim 21, wherein the plurality of dynamic behaviors comprises a plurality of system-defined behaviors and a plurality of application-defined behaviors.

* * * * *